United States Patent [19]

Nakajima

[11] Patent Number: 4,703,627
[45] Date of Patent: Nov. 3, 1987

[54] COMPRESSOR MALFUNCTION DEVICE HAVING ENGINE START-UP OVERRIDE

[75] Inventor: Tadao Nakajima, Haruna, Japan

[73] Assignee: Sanden Corporation, Gunma, Japan

[21] Appl. No.: 836,504

[22] Filed: Mar. 5, 1986

[30] Foreign Application Priority Data

Mar. 5, 1985 [JP] Japan .............................. 60-30253[U]

[51] Int. Cl.$^4$ .............................................. B60H 1/32
[52] U.S. Cl. ........................................ 62/133; 62/158; 62/126
[58] Field of Search ................ 62/157, 158, 133, 126, 62/230, 129, 243, 323.4; 417/223; 192/103 R, 104 R, 106 R, 150

[56] References Cited

U.S. PATENT DOCUMENTS

| | | | |
|---|---|---|---|
| 3,931,560 | 1/1976 | Willson | 62/158 X |
| 4,005,585 | 2/1977 | Matthews | 62/193 X |
| 4,028,593 | 6/1977 | Newell | 62/158 X |
| 4,045,973 | 9/1977 | Anderson et al. | 62/158 |
| 4,355,959 | 10/1982 | Kono et al. | 417/223 |
| 4,393,966 | 7/1983 | Kono et al. | 192/56 R |
| 4,462,491 | 7/1984 | Kono et al. | 192/84 R |
| 4,480,961 | 11/1984 | Kono et al. | 417/15 |

FOREIGN PATENT DOCUMENTS 0033582 3/1980 Japan .................................... 62/158

Primary Examiner—Harry B. Tanner
Attorney, Agent, or Firm—Banner, Birch, McKie & Beckett

[57] ABSTRACT

The present invention is directed to a device for sensing compressor malfunctions and disengaging the compressor from the engine's driving force upon detection of a malfunction. A malfunction is defined herein as the rotation of the compressor below a predetermined speed. In situations where the compressor is on during engine start-up, the engine's starting motor will be exerted to the extent that the engine, and hence the compressor, will not rotate at its proper speed, making engine start-up more difficult. In order for the engine start-up condition not to produce a malfunction detection and erroneously disengage the compressor from the system, a malfunction override circuit is provided. The override circuit comprises a capacitor which is discharged through a transistor connected to the relay for controlling the current to the clutch coil. The relay remains closed due to this capacitor voltage, and the compressor remains engaged, thereby overriding the malfunction detector during engine start-up.

10 Claims, 4 Drawing Figures

COMPRESSOR MALFUNCTION DEVICE HAVING ENGINE START-UP OVERRIDE

BACKGROUND OF THE INVENTION

1. Technical Field

The present invention relates to a device for sensing malfunctions in a refrigerant compressor and disengaging the compressor from its driving source upon detection of a malfunction. More particularly, the present invention includes a device for overriding the malfunction sensor during engine start-up.

2. Background Information

Automotive air conditioning systems typically include a compressor engageable to the driving force of the automobile's engine via an electromagnetic clutch. As is well known in the art, the shaft of the compressor extends through the center of a pulley of the clutch and is affixed to an armature plate of the clutch. A V-shaped belt is connected between a pulley connected to the shaft of the engine and the pulley of the electromagnetic clutch. In order to cause the shaft of the compressor to rotate, current is supplied to a coil which is wrapped about the clutch between the pulley and the compressor. This current sets up a field which attracts and frictionally engages the armature plate to a portion of the driven pulley, thereby rotating the shaft of the compressor.

The compressor can malfunction, for example due to lubrication problems or component breakage, causing the compressor shaft to stop rotating. Upon such malfunction, slippage between the belt and the clutch pulley is produced, causing rapid wear and early breakage of the belt. In applications where the clutch belt also drives other automotive components, such as a generator, oil pump for power steering, or a water pump, sudden and unexpected belt breakage can have serious repercussions. In order to eliminate the rapid wear of the belt due to compressor malfunction, prior art devices are known, such as that shown in FIG. 1, which sense the compressor rotation and disengage the electromagnetic clutch upon sensing compressor malfunction.

As shown in FIG. 1, the driving force of engine 1 is transmitted to electromagnetic clutch 3 via belt 2, causing compressor 4 to rotate when clutch 3 is engaged, as explained above. The rotation of compressor 4 is detected by revolution sensor 5, which is typically built into the housing of the compressor and senses a rotating magnetic portion of the compressor. Sensor 5 usually includes an electromagnetic coil wound about a permanent magnet; rotation of the magnetic compressor portion causes the density of the magnetic flux formed between the permanent magnet and the rotating portion to change. Consequently, pulses, shown in FIG. 2, are generated from the coil at a period indicative of the rotational speed of compressor 4. The pulses from sensor 5 are rectified by rectifier 6, and the rectified pulses are counted by counter 7, which counts the number of pulses produced within a predetermined time period. If the number of pulses is less than a predetermined number, the compressor is rotating at a slower-than-expected rate, and a malfunction is assumed. Upon such malfunction, counter 7 generates a malfunction signal to control circuit 8, which disengages the compressor from the clutch by deenergizing the clutch coil via relay (not shown). The de-energized coil releases the armature plate, taking the compressor out of the system, thereby preventing damage to those automotive components driven by belt 2.

One of the disadvantages of the malfunction detector of FIG. 1 occurs when the engine is off but the switch of the air conditioning apparatus is in the "ON" position. When the ignition switch is turned on to start the engine, electric current is applied to the coil of the electromagnetic clutch, engaging the compressor. However, the starting motor cannot easily start the engine with the compressor engaged. Accordingly, the engine turns at a slower rate, and the compressor generates pulses at less than the predetermined rate, causing the control circuit to erroneously disengage the compressor.

One solution to the above problem is sensing both engine and compressor rotation, as shown for example in U.S. Pat. No. 4,462,491 issued to Kono et al. and herein incorporated by reference. However, these types of detection devices are expensive, due in part to the requirement of two sensors, and complex circuitry is also required to co-ordinate the two sensors.

SUMMARY OF THE INVENTION

Accordingly, it is an object of the present invention to provide a device to detect the malfunction of a compressor.

Additionally, it is an object of the present invention to detect the malfunction of a compressor taking into account the starting conditions of the engine and compressor, yet requiring only one sensor.

The present invention is directed to a device for sensing compressor malfunctions and disengaging the compressor from the engine's driving force upon detection of a malfunction. A malfunction is defined herein as the rotation of the compressor below a predetermined speed. In situations where the compressor is on during engine start-up, the engine's starting motor will be exerted to the extent that the engine, and hence the compressor, will not rotate at its proper speed, making engine start-up more difficult. In order for the engine start-up condition not to produce a malfunction detection and erroneously disengage the compressor from the system, a malfunction circuit is provided. The override circuit comprises a capacitor which is discharged through a transistor connected to the relay for controlling the current to the clutch coil. The relay remains closed due to this capacitor voltage, and the compressor remains engaged, thereby overriding the malfunction detector during engine start-up.

DESCRIPTION OF THE PREFERRED EMBODIMENT

Figure 1:
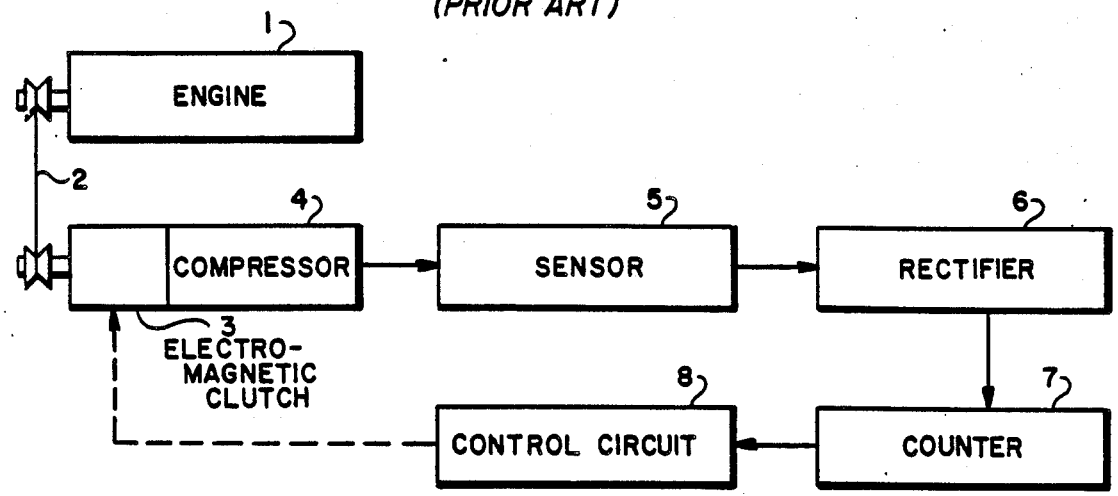
FIG. 1 shows a prior art device for sensing compressor malfunction and disengaging the electromagnetic clutch upon the occurrence of a malfunction.
Figure 2:
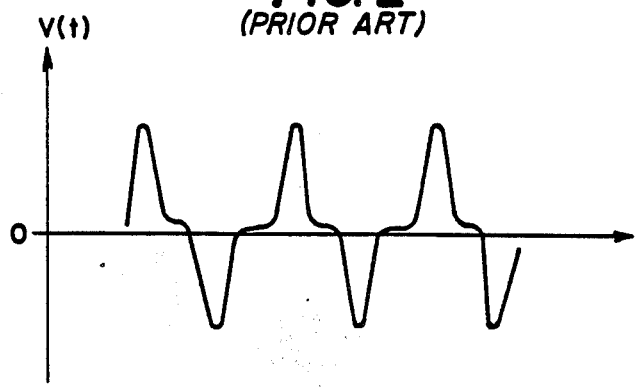
FIG. 2 shows a voltage-vs-time diagram of the pulses produced by the rotational sensor of FIG. 1.
Figure 3:
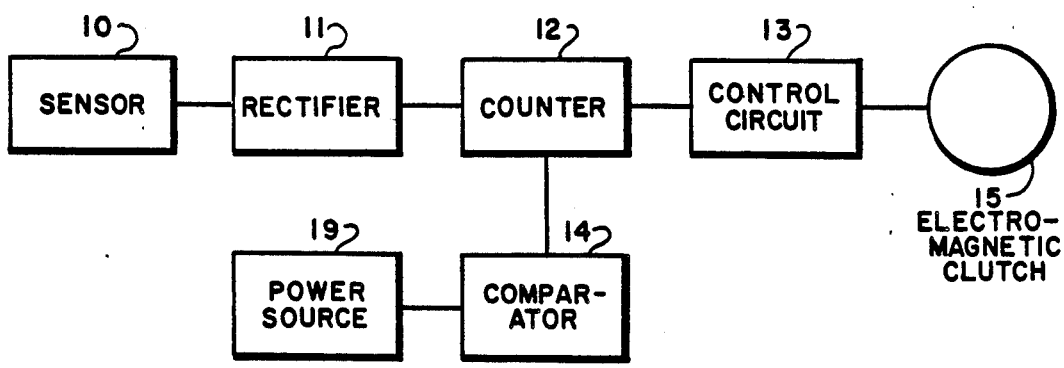
FIG. 3 is a block diagram of the preferred embodiment of the compressor malfunction detector of the present invention.

Turning now to FIG. 3, a block diagram of the compressor malfunction detector of the present invention is shown. As explained above with reference to FIG. 1, the malfunction detector includes sensor 10 to detect the rotational portion of the compressor. The sensor outputs pulses indicative of the rotational speed of the compressor, as shown in FIG. 2. These pulses are rectified by rectifier 11 and the rectified pulses are counted by counter 12, which counts the number of pulses produced within a predetermined time period. If the number of pulses is less than a predetermined number, counter 12 generates a malfunction signal to control circuit 13, which disengages the compressor from the clutch by de-energizing the clutch coil via relay 22 (FIG. 4).

The malfunction detector of the present invention includes the addition of voltage comparator 14 coupled between power source 19 and counter 12. A signal generated from comparator 14 is input to counter 12 to reset control circuit 13 during engine start-up. In this way, if the compressor is engaged at engine start-up, the slow rotational speed of the compressor will not produce a malfunction signal and erroneously disengage the compressor.

Figure 4:
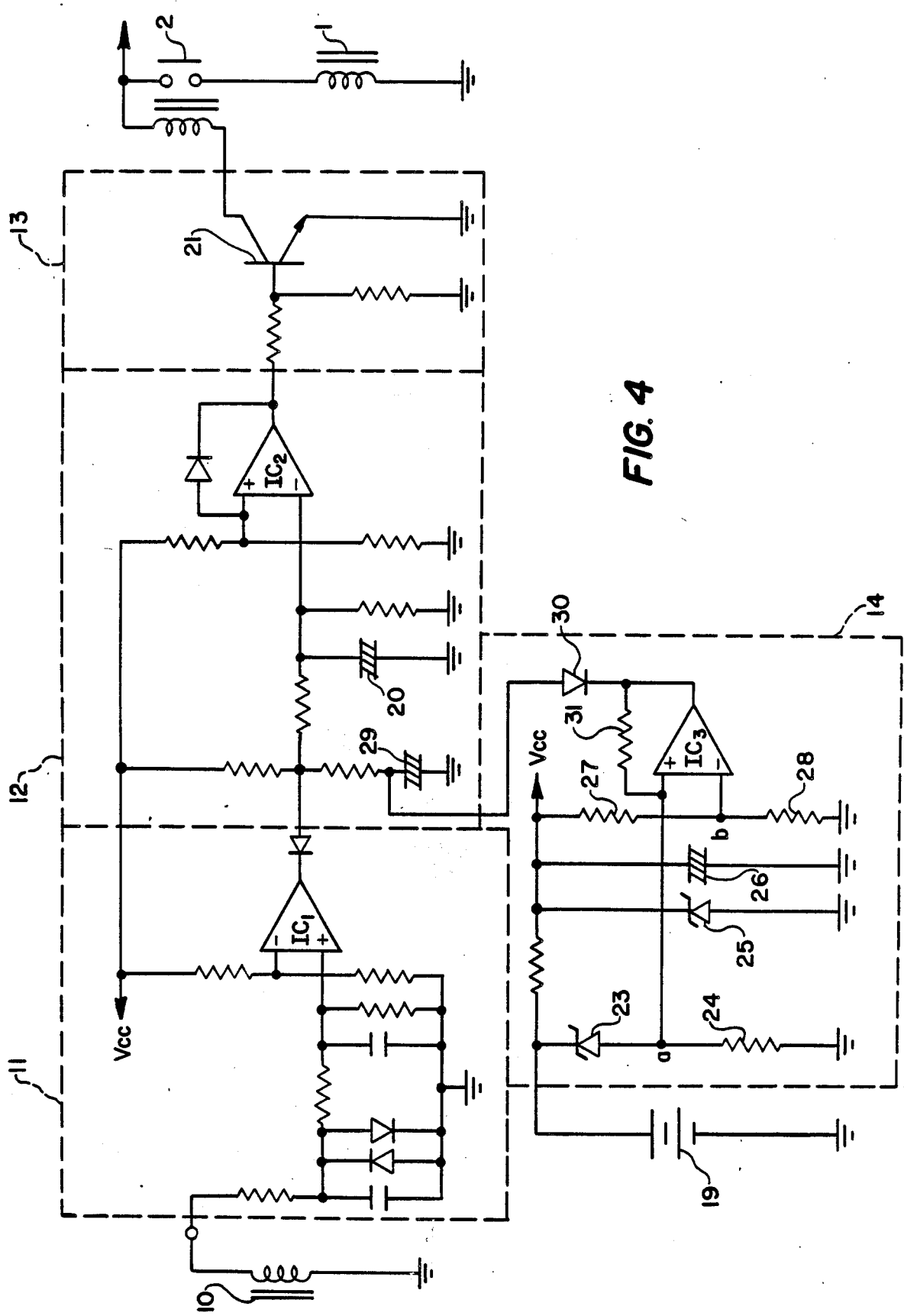
FIG. 4 is a circuit diagram of the compressor malfunction detector shown in FIG. 3.

Turning now to FIG. 4, the preferred embodiment of a circuit diagram for the malfunction detector of FIG. 3 is shown. Pulses from sensor 10 are input to rectifier 11 where they are compared with the base voltage of power source 19 (the battery of the automobile) by comparator IC1 and rectified. The rectified pulse signal input to counter 12 repeatedly charges and discharges capacitor 20. If the number of pulses are below a predetermined number, the output of comparator IC2 becomes low. As a result of the high-to-low transition of comparator IC2, transistor 21 is turned off and relay 22 is opened. Accordingly, the coil of electromagnetic clutch 15 is de-energized, and the compressor is disengaged.

As shown in comparator 14, power source 19 is connected to resistor 24 through Zener diode 23. Additionally, power source 19 is connected in parallel across Zener diode 25, capacitor 26, and voltage-dividing resistors 27 and 28. The inverting terminal of comparator IC3 is connected to point b between voltage-dividing resistors 27 and 28 to obtain the divided voltage. The output terminal of comparator IC3 is connected to capacitor 29 of counter 12 through diode 30, and is also connected to the non-inverting terminal of itself through resistor 31.

Assume that the engine is initially off and the switch of the air conditioning apparatus is on. When the ignition switch is turned on, the voltage at point a is less than the voltage at point b and the output voltage of comparator IC3 is therefore low. Thus, the voltage which is precharged in capacitor 29 of counter 12 is discharged, thereby operating transistor 21 to energize relay 22. Accordingly, at engine start-up, even if the revolution sensor cannot maintain the energization of relay 22 via IC2, the voltage resident in capacitor 29 will maintain such. In the preferred embodiment, the voltage resident in capacitor 29 is limited to maintaining the energization of relay 22 only for a predetermined period of time, chosen in the preferred embodiment as the time required for the engine to start and the revolution sensor itself to take over. In this way, should a compressor malfunction occur at start-up, relay 22 will only be energized for a limited time.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What is claimed is:

1. A compressor malfunction device for use with a compressor connected to an electromagnetic clutch, the clutch including a clutch coil, said malfunction device to sense compressor malfunction and disengage the compressor from the electromagnetic clutch, said compressor malfunction device comprising:

a sensor operatively coupled to the compressor to sense the rotation of the compressor and output a train of pulses indicative of the rotational speed of the compressor;

a counter operatively coupled to said sensor to count said pulses;

a relay operatively coupled to the electromagnetic clutch coil to control the engagement of the compressor to the electromagnetic clutch;

a relay control means, operatively coupled between said counter and said relay, for energizing said relay so as to engage the compressor with the clutch whenever said count of said rectified pulses is at least a predetermined count per first predetermined time period, and for de-energizing said relay so as to disengage the compressor from the clutch whenever said count is below the predetermined count per first predetermined time period; and voltage comparator means, operatively coupled between the automotive d.c. power source and said counter, for comparing the voltage of the power source to a predetermined voltage indicative of the start-up of the engine and outputting a pulse to said relay control means to maintain relay energization for a second predetermined time period indicative of the time required to start the engine.

2. A compressor malfunction device for use with a compressor connected to an electromagnetic clutch, the clutch including a clutch coil, said malfunction device to sense compressor malfunction and disengage the compressor from the electromagnetic clutch, said compressor malfunction device comprising:

a sensor operatively coupled to the compressor to sense the rotation of the compressor and output a train of pulses indicative of the rotational speed of the compressor;

a rectifier operatively coupled to said sensor to rectify said train of pulses;

a counter operatively coupled to said rectifier to count said rectified pulses;

a relay operatively coupled to the electromagnetic clutch coil to control the engagement of the compressor to the electromagnetic clutch.

a relay control means, operatively coupled between said counter and said relay, for energizing said relay so as to engage the compressor with the clutch whenever said count of said rectified pulses is at least a predetermined count per first predetermined time period, and for de-energizing said relay so as to disengage the compressor from the clutch whenever said count is below the predetermined count per first predetermined time period; and voltage comparator means, operatively coupled between the automotive d.c. power source and said counter, for comparing the voltage of the power source to a predetermined voltage indicative of the start-up of the engine and outputting a pulse to said relay control means to maintain relay energization for a second predetermined time period indicative of the time required to start the engine.

3. In a device for controlling a compressor for automotive air conditioning apparatus, the device including a revolution sensor coupled to the compressor to detect the rotational speed of the compressor which is driven by the automobile engine through an electromagnetic clutch and to output a signal indicative of the rotational speed of the compressor, a malfunction detector operatively coupled to the sensor to detect a malfunction of the compressor based on said signal indicative of the rotational speed and outputting a first signal if no malfunction is detected and outputting a second signal if a malfunction is detected, and an electromagnetic clutch control means coupled between said malfunction detector and the electromagnetic clutch for maintaining the engagement of the clutch when said first signal is present and for disengaging the clutch when said second signal is present, the improvement comprising engine start-up detection means coupled to said malfunction detector for detecting the start-up of the engine and outputting said first signal for a predetermined time period upon detection of the start-up of the engine.

4. The device of claim 3 wherein said predetermined time period is indicative of the time period required to start the engine.

5. The device of claim 4 wherein said engine start-up detection means comprises a voltage comparator coupled to the d.c. power source of the automobile, said comparator detecting the start-up of the engine by sensing a decrease in the voltage of the power source below a predetermined voltage level.

6. The device of claim 4 wherein said engine start-up detection means comprises:
   a voltage comparator having an inverting, a non-inverting and an output terminal;
   a first diode coupled in a forward-biased direction between said non-inverting terminal and the d.c. power source of the automobile;
   a first resistor coupled between said non-inverting terminal and a reference potential; and
   a voltage-divider having second and third resistors, said second resistor coupled between the d.c. power source of the automobile and said inverting terminal, and said third resistor coupled between said inverting terminal and the reference potential.

7. The device of claim 6 wherein said first diode is a Zener diode and wherein said engine start-up detection means further comprises a fourth resistor coupled between said non-inverting terminal and said output terminal.

8. The device of claim 7 wherein said engine start-up detection means further comprises a second Zener diode connected in a forward-biased direction between the reference potential and the d.c. power source of the automobile.

9. The device of claim 8 wherein said engine start-up detection means further comprises a fifth resistor connected between the cathode of said second Zener diode and the d.c. power source of the automobile.

10. The device of claim 9 wherein said engine start-up detection means further comprises a third diode coupled in a forward-biased direction betweeen said malfunction detector and said output terminal of said voltage comparator.

* * * * *